UNITED STATES PATENT OFFICE.

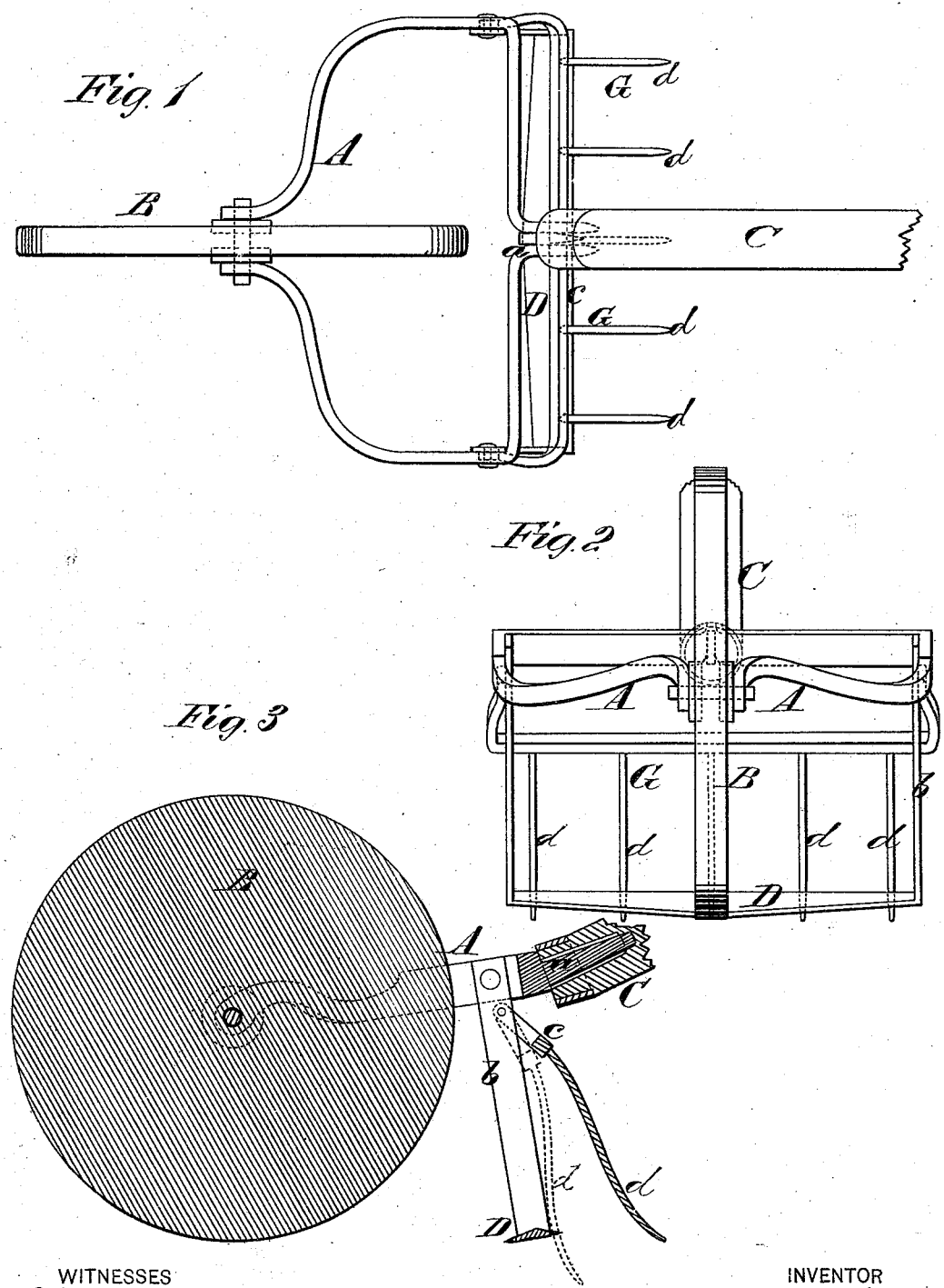

JOHN CHRISTY, OF CLYDE, OHIO, ASSIGNOR OF ONE-HALF HIS RIGHT TO MILO HUNTER AND BYRON O. BRIGHAM, OF SAME PLACE.

IMPROVEMENT IN GARDEN IMPLEMENTS.

Specification forming part of Letters Patent No. 168,234, dated September 28, 1875; application filed July 10, 1875.

*To all whom it may concern:*

Be it known that I, JOHN CHRISTY, of Clyde, in the county of Sandusky and State of Ohio, have invented a new and valuable Improvement in Garden Implements; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my garden implement. Fig. 2 is a front view of the same, and Fig. 3 is a longitudinal vertical sectional view thereof.

This invention has relation to hand implements for cultivating young plants, eradicating weeds, and harrowing the surface-soil; and the nature of my invention consists in combining with a double-edged hoe a harrowing-fork, which is hinged to the sides of the hoe, and so constructed that while drawing the implement backward the tines of this fork will operate as a rake and also as a harrow, as will be hereinafter explained.

In the annexed drawings, A designates a bow-frame, which is preferably made of two pieces of strap-iron, bent so as to leave a tang, $a$, and two bearings for the axle of a wheel, B. This frame A is rigidly secured by its tang into a handle, C, which may be made like a well-known hoe-handle. D designates the hoe or cutter, which is a narrow strip of steel, sharpened on its front and rear edges, and bent so that it forms two right angles, the vertical cutting portions $b\ b$ of which are rigidly secured in any suitable manner to the bowed parts of frame A at the junction of these parts with the straight parts, as shown in Fig. 3. G designates a rake, consisting of a head, $c$, and tines $d$. The angular ends of the head $c$ are pivoted to the vertical portions $b\ b$ of the hoe D, near the attachments of these portions to the frame A, so that the tines $d$, which are rigidly secured to this head, are free to swing backward when the hoe is thrust forward. When the hoe is moved back the rake-head bears against the portions $b\ b$ of the hoe, and gathers the weeds and trash.

It will be observed, by reference to the drawings, that the tines of the rake are extended down beneath the transverse portion of the hoe, so that in the act of raking the points of the tines will harrow and pulverize the soil at the same time that the cutter or hoe loosens it. The center wheel B affords a rolling support for the hoe and rake, and will allow the same to be run as close as desired to the plants without injuring them.

What I claim as new, and desire to secure by Letters Patent, is—

In combination, with the double-edged hoe D, secured rigidly to the frame A, the pivoted rake G, the tines of which are extended below the horizontal portion of the hoe, substantially in the manner and for the purposes described.

In testimony that I claim the above I have hereunto subscribed my name in the presence of two witnesses.

JOHN CHRISTY.

Witnesses:
 JOHN M. LEMMON,
 CHESTER HUNTER.